(12) United States Patent
Larson et al.

(10) Patent No.: US 8,599,253 B2
(45) Date of Patent: Dec. 3, 2013

(54) PROVIDING PHOTOGRAPHIC IMAGES OF LIVE EVENTS TO SPECTATORS (75) Inventors: Bradley R. Larson, Boise, ID (US); Curt N. Van Lydegraf, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1538 days.

(21) Appl. No.: 11/732,427

(22) Filed: Apr. 3, 2007

(65) Prior Publication Data
US 2008/0246840 A1 Oct. 9, 2008

(51) Int. Cl.
H04N 7/18 (2006.01)
H04N 5/225 (2006.01)

(52) U.S. Cl.
USPC .... 348/143; 348/157; 348/211.99; 348/211.3

(58) Field of Classification Search
USPC ................... 348/211.1, 211.2, 211.3, 211.11, 348/211.12, 211.99
See application file for complete search history.

(56) References Cited

U.S. PATENT DOCUMENTS

| | | | |
|---|---|---|---|
| 5,850,352 A | 12/1998 | Moezzi et al. | |
| 6,707,487 B1 | 3/2004 | Aman et al. | |
| 7,015,954 B1 * | 3/2006 | Foote et al. | 348/211.11 |
| 7,079,176 B1 * | 7/2006 | Freeman et al. | 348/207.1 |
| 7,149,549 B1 | 12/2006 | Ortiz et al. | |
| 7,542,073 B2 * | 6/2009 | Li et al. | 348/218.1 |
| 2002/0063799 A1 | 5/2002 | Ortiz et al. | |
| 2002/0199198 A1 | 12/2002 | Stonedahl | |
| 2003/0112354 A1 | 6/2003 | Ortiz et al. | |
| 2003/0135865 A1 * | 7/2003 | Jung | 725/105 |
| 2004/0032495 A1 | 2/2004 | Ortiz | |
| 2004/0071209 A1 | 4/2004 | Burg et al. | |
| 2004/0071214 A1 | 4/2004 | Burg et al. | |
| 2005/0125505 A1 * | 6/2005 | Kim et al. | 709/219 |
| 2005/0193421 A1 * | 9/2005 | Cragun | 725/80 |
| 2006/0007318 A1 * | 1/2006 | Kanayama et al. | 348/211.3 |
| 2006/0061664 A1 * | 3/2006 | Ito | 348/211.11 |
| 2006/0170956 A1 | 8/2006 | Jung et al. | |
| 2006/0170958 A1 | 8/2006 | Jung et al. | |
| 2006/0174203 A1 | 8/2006 | Jung et al. | |
| 2006/0174204 A1 | 8/2006 | Jung et al. | |
| 2006/0174206 A1 | 8/2006 | Jung et al. | |
| 2006/0187227 A1 | 8/2006 | Jung et al. | |
| 2006/0187228 A1 | 8/2006 | Jung et al. | |
| 2006/0187230 A1 | 8/2006 | Jung et al. | |
| 2006/0244831 A1 * | 11/2006 | Kraft et al. | 348/157 |
| 2006/0285150 A1 | 12/2006 | Jung et al. | |
| 2006/0288375 A1 | 12/2006 | Ortiz et al. | |
| 2007/0103558 A1 * | 5/2007 | Cai et al. | 348/211.11 |

FOREIGN PATENT DOCUMENTS

WO WO 03/044734 A2 5/2003
WO WO 2005/099423 A2 10/2005

* cited by examiner

Primary Examiner — James M Hannett
Assistant Examiner — Dwight C Tejano (57) ABSTRACT

A method of providing photographic images of live events to a spectator includes obtaining at least one photographic image from at least one camera at a live event; providing a version of the at least one photographic image to an electronic device being used by the spectator; and receiving a selection of a the photographic image or a portion of the photographic image selected by said spectator using the electronic device.

9 Claims, 7 Drawing Sheets

PROVIDING PHOTOGRAPHIC IMAGES OF LIVE EVENTS TO SPECTATORS

BACKGROUND

Often spectators of a live event feel the desire to capture a photographic remembrance of the event. However, factors such as a limited number of photographic vantage points, a large number of spectators, distance from the event, distraction, bad lighting, difficulty with camera operation, and other factors may impede a spectator from capturing a satisfactory photograph or video of the event.

At large group events, the issue of obtaining photographs and video for spectators has previously been addressed by allowing the spectators to vie for good vantage points to see and take a photo or video. Generally, this approach results in overcrowding of the good vantage points and may be a frustrating experience for those attempting to take photos or video at those points. Furthermore, the overcrowding of the good vantage points may result in poor quality photos or video and missed opportunities to take photos or video recordings at the precise moment in which the photo or video is desired.

Another approach to providing photographic images of large group events includes hiring a professional photographer to take photos and/or video recordings of the event and later offer the results for sale to the spectators. While this approach frequently provides photos and video of higher quality, the photo and video may be costly for the spectators to purchase. Also, the content of the photos and video taken by the photographer may not meet the specific needs of the spectators. Additionally, consumers may be forced to purchase desired photos and/or video from the photographer in expensive packages containing unwanted photos or video.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

In some cases, it may be desirable for spectators of a live event to obtain personalized photographic and/or video images of the live event. To address the issues of improving cost, quality, and personalization of photos and/or video for spectators of a live event, the present specification describes exemplary methods and systems providing spectators with images of live events. The images are obtained from photographic images of the event obtained from at least one camera situated at a vantage point. In some embodiments, composite images of the event may be created from a plurality of cameras at one or more vantage points. The spectator may then receive a printed image, video recording, or digital copy of photographs and/or video in exchange for payment.

As used in the present specification and in the appended claims, the term "camera" refers to a device having a lens and aperture through which an image is projected and captured either on a physical medium, such as film, or electronically. Cameras as thus defined include, but are not limited to, digital cameras, video cameras, film cameras, and combinations thereof.

As used in the present specification and in the appended claims, the term "photographic image" or "photo" refers to both still and moving images obtained by digital or film-based cameras. Examples of photographic images as thus defined include, but are not limited to, images displayed on a computer or other screen, digital representations of images, images stored on physical media, printed images, and combinations thereof. Photographic images may also comprise accompanying sound.

As used in the present specification and in the appended claims, the term "personal electronic device" refers to an electronic apparatus configured to receive images from a central processing element such as a server. Personal electronic devices thus defined may be battery-powered and may communicate with the central processing element through a wireless connection. Personal electronic devices may also be remote computing devices (e.g., laptop and desktop computers, set-top boxes, etc.) able to communicate with the central processing system through a network such as the Internet. Other personal electronic devices thus defined may receive power and/or communicate with the central processing element through a wired connection. Examples of such personal electronic devices include, but are not limited to, personal digital assistants (PDAs), portable computers, cellular phones, wired devices provided by a venue (e.g. attached to seats), and custom devices.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary methods and systems for providing photos of live events to spectators.

Exemplary Systems

Figure 1:
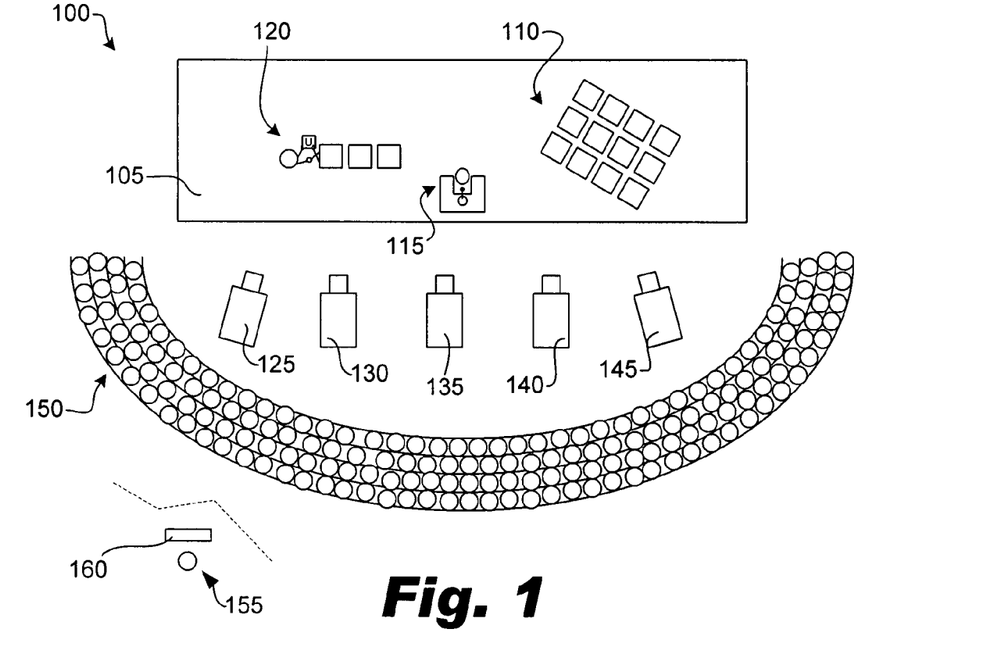
FIG. 1 is an illustration of an exemplary live event according to principles described herein.

Referring now to FIG. 1, an exemplary live event (100) is shown at which personalized, high quality photographic images may be provided to a plurality of spectators (150) according to principles described herein. The live event (100) may comprise a plurality of activities occurring simultaneously in or on different portions (110, 115, 120) of a common area such as a stage (105). For example, on one portion (110) of the stage (105), a group of people may be assembled. At another portion (115) of the stage (105), a speaker may be standing at a podium. At still another portion (120) of the stage (105), a group of people may be receiving documents.

Some of the spectators (150) may take sufficient interest in the live event (100) to desire photographic memorabilia of the event (100). As widely divergent aspects of the live event (100) may appeal to different spectators (150), a demand for personalized high quality photographic images may exist among the spectators.

A plurality of cameras (125, 130, 135, 140, 145) is arranged at different vantage points of the live event (100). In some embodiments, the cameras (125, 130, 135, 140, 145) are high definition video cameras that capture continuous photographic images of the live event (100). Spectators may receive composite photographic images from the cameras (125, 130, 140, 145) on personal electronic devices and select portions of the composite photographic images that they desire to keep or purchase. As used herein, the term "composite images" may refer to a feed from each of the cameras with the user being able to switch between the feeds or a tiled view simultaneously showing the feed from two or more of the cameras. The term "composite images" may also refer to an image that has been processed to include the feed from two or more of the cameras in a single, unified resulting image.

At some point after the user selects an image or portions of an image for capture, the spectator-selected photographic images may then be extracted from source data of one or more of the cameras (125, 130, 135, 140, 145) and uploaded to an online service to be viewed, shared, printed or stored in physical media. Printed images and images stored in physical media may be shipped to the spectators (150) from the online service once payment is received from or arranged by the spectator (150).

In other embodiments the photographic images may be printed or put onto physical media at the venue of the live event (100) and sold to the spectators (150) at the event (100). In still other embodiments, the photographic images may be printed and made available to the spectators (150) by mail, pickup, other physical delivery, download, email, or other electronic delivery.

As also shown in FIG. 1, not all the spectators may be present at the live event (100). For example, any number of remote spectators (e.g., 155) may be viewing the event from different locations. For example, the remote spectators (155) may be watching the event by television, closed circuit, cable or satellite broadcast, via the Internet or other computer network or through some other means.

Each such remote viewer (155) will have a device (160) on which to view the live event (100). The device (160) will include a display and associated equipment for receiving a transmission from the cameras (125-145) or other camera imaging the live event (100). This device (160) may include, for example, a personal computer, a set-top box or similar devices.

Using the device (160), the remote spectator (155) can receive the same data as the spectators (150) at the live event receive with the personal electronic devices described above. The remote spectator (155) can then also select an image or portions of an image output by one or more of the cameras (125, 130, 135, 140, 145) and have that selection be available for purchase through an on-line service or on a physical medium as described above and as further detailed below.

Figure 2:
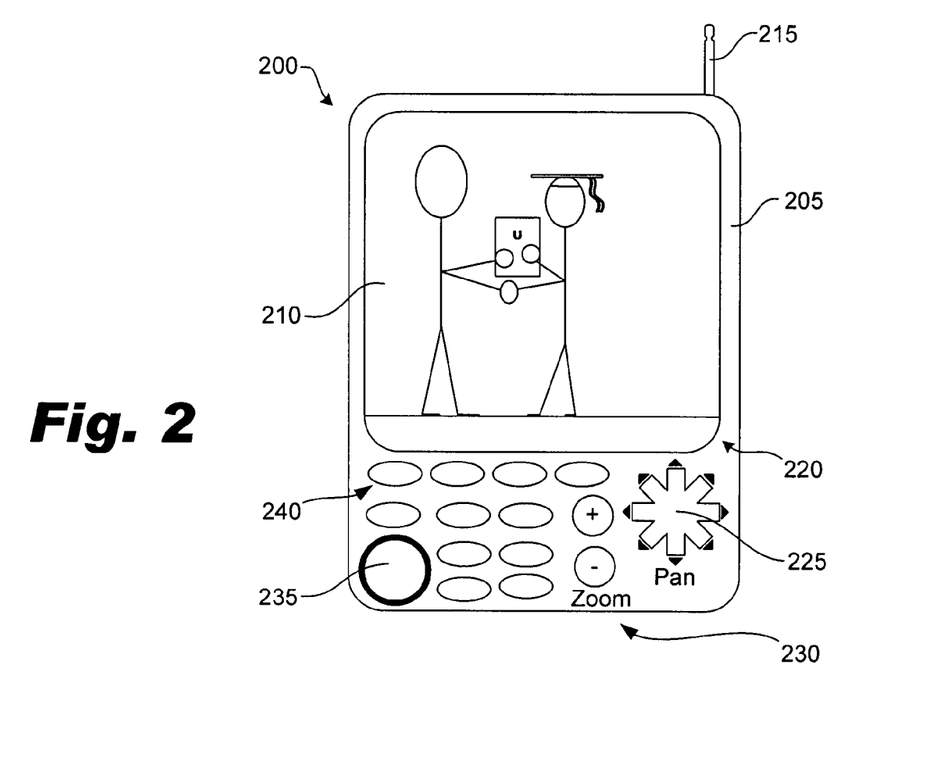
FIG. 2 is an illustration of an exemplary personal electronic device according to principles described herein.

Referring now to FIG. 2, an exemplary personal electronic device (200) according to the principles described herein is shown. The exemplary personal electronic device (200) comprises a main case (205), a screen (220), and controls (225, 230, 235, 240). The exemplary personal electronic device (200) may receive a live image captured by one or more of the cameras (125, 130, 135, 140, 145; FIG. 1). This image may be a composite image as defined above. The live image is transmitted wirelessly to the antenna (215) of the personal electronic device (200).

The live composite photographic video image may be transmitted to the personal electronic device (200) at a much lower resolution than the resolution at which the cameras (125, 130, 135, 140, 145; FIG. 1) actually captured the constituent photographic images that make up the composite photographic image. A lower resolution may conserve bandwidth and facilitate easier reception and processing of the composite photographic image by the personal electronic device (200). Furthermore, a lower resolution composite image received on the personal electronic device (200) may discourage spectators (150, FIG. 1) from attempting to steal images by making local digital copies of the received composite photographic image on the personal electronic device (200).

The personal electronic device (200) and/or software running on the personal electronic device (200) may be designed to facilitate the selection of a portion (210) of the composite photographic image obtained by the cameras (125, 130, 135, 140, 145; FIG. 1). In some embodiments, the composite photographic image may be a panoramic video image of a live event. By adjusting centering, size, zoom, and time controls, any of an infinite number of available photographic images may be derived from the composite photographic image. As these images are available to spectators (150, FIG. 1) regardless of physical location, any of the spectators (150, FIG. 1) may capture a personalized view of any of the aspects of the live event contained in the composite photographic image.

The controls (225, 230, 235, 240) of this embodiment of the personal electronic device (200) comprise a pan control (225) to allow a spectator to select a certain portion of a composite photographic image received from the cameras (125, 130, 135, 140, 145; FIG. 1). Zoom controls (230) may allow the spectator to select a level of magnification according to his or her preference. Other buttons and keys (235, 240) may perform a variety of functions as indicated on the screen (220) or elsewhere such as entering text or providing answers to screen prompts. The controls of the personal electronic device (200) may also include a touch-sensitive screen (220) that can be operated with a stylus, a user's finger or the like.

The personal electronic device (200) is shown in FIG. 2 with a spectator selected photographic image (210) displayed on the screen (220). As described above, the photographic image (210) is specifically chosen by the spectator using the controls (225, 230, 235, 240).

In some embodiments, the personal electronic device (200) may be a personal digital assistant (PDA), cellular phone, or other device personally owned by a spectator. In such embodiments, the personal electronic device (200) may have special software installed permitting the spectator to access the wirelessly transmitted composite image from the cameras (125, 130, 135, 140, 145; FIG. 1) without requiring specialized hardware. For example, many personal digital assistants and cellular phones are equipped with wireless networking capabilities that could be configured to receive a wireless transmission from a server of the composite photographic image and relay position, zoom, time, and other data back to the server relating to personalized spectator-selected images. In some embodiments, the personal electronic device (200) may be specifically designed for the purpose of receiving the wireless transmission of the composite photographic image from the cameras (125, 130, 135, 140, 145; FIG. 1) at the live event (100, FIG. 1) and relaying image selection data back to the server.

The personal electronic device (200) is shown with a spectator-selected portion (210) of a composite photographic image displayed on the screen (220). This portion (210) of the composite photographic image was obtained by the spectator selecting specific location, zoom, and time coordinates of the composite photographic image received from the cameras (125, 130, 135, 140, 145; FIG. 1)

Figure 3:
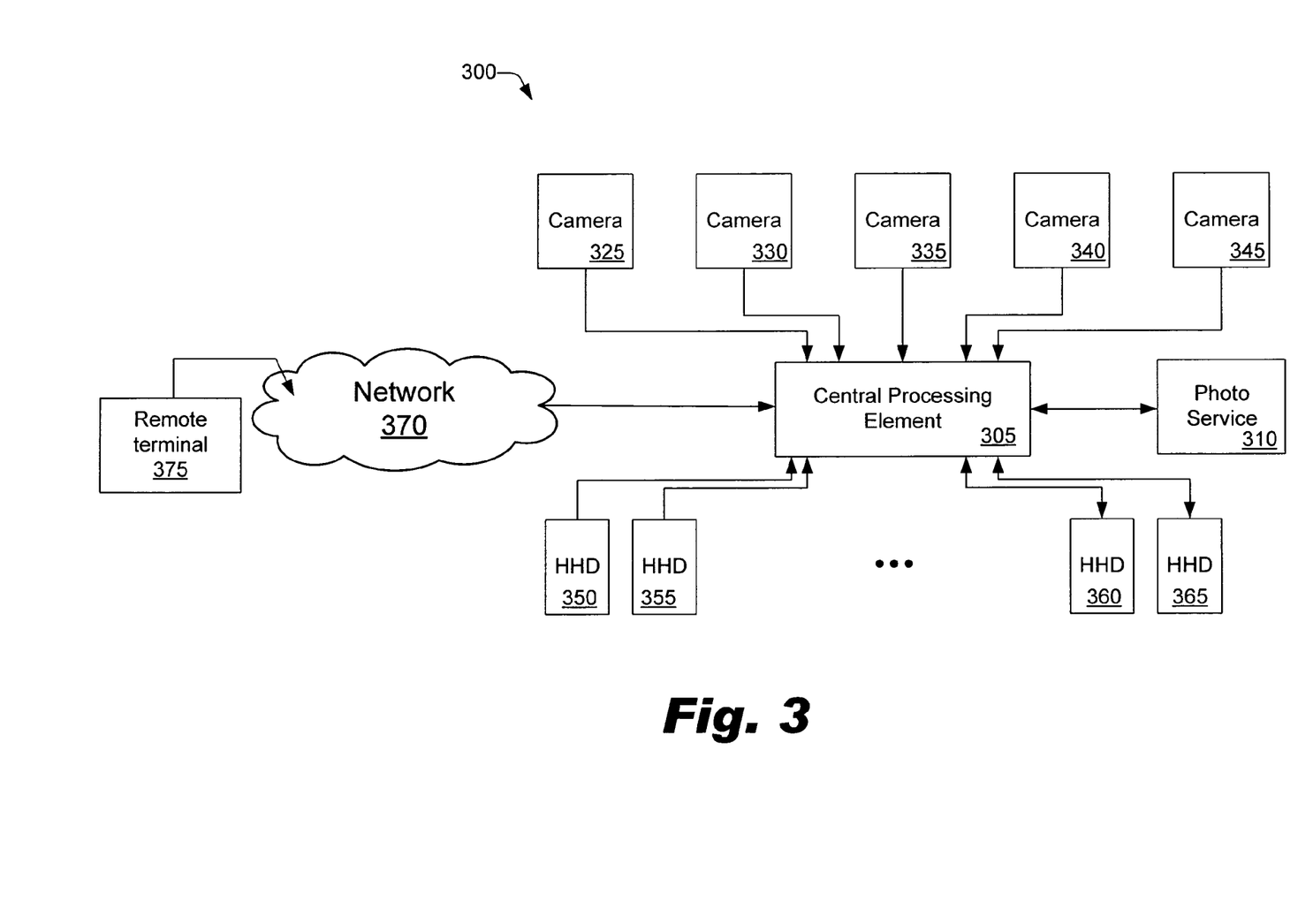
FIG. 3 is an illustration of an exemplary system for providing ideal photos of live events to spectators, according to principles described herein.

Referring now to FIG. 3, a block diagram of an exemplary system (300) for providing photographic images of live events to spectators is shown. The system (300) comprises an array of cameras (325, 330, 335, 340, 345) in communication with a central processing element (305). The cameras (325, 330, 335, 340, 345) are configured to continuously stream high-definition video from different angles of a vantage point to the central processing element (305). The cameras (325, 330, 335, 340, 345) may also continuously stream high-definition video from a variety of different zoom settings or magnification settings to the central processing element (305).

The central processing element (305) is configured to combine the high-definition video images received from the cameras (325, 330, 335, 340, 345) into a composite video image. The central processing element (305) is also in communication with a plurality of personal electronic devices (350, 355, 360, 365) being operated by the spectators of the event. The personal electronic devices (350) may be spectator-owned or provided at the venue of an event. In embodiments where the personal electronic devices (350) are provided at the venue, the devices (350) may be wired devices attached to seats. In some examples, individual personal electronic devices (350) may be incorporated into the backs of seats.

Also, the central processing element (305) may be connected to a network (370). This network (370) may be a cable, closed circuit or computer network, including a global computer network, such as the Internet. Through this network (370), any number of remote spectators may also communicate with the central processing element (305). As shown in FIG. 3, each such remote spectator may employ a remote terminal (375), such as a computer or set-top box, to communicate via the network (370) with the central processing element (305).

The central processing element (305) is configured to continually broadcast a low-resolution version of the composite photographic image to the personal electronic devices (350, 355, 360, 365) and any remote terminals (375) for remote spectators. The low-resolution version of the composite photographic image may be a video image or a periodically updated still image.

Examples of central processing elements consistent with this system include, but are in no way limited to, computers, servers, application-specific integrated circuits (ASICs), other processing devices, and combinations thereof. The central processing element may, in some embodiments, be a single device. In other embodiments the central processing element (305) may comprise a plurality of devices in communication with each other.

A spectator may select all or a specific user-identified portion of the low-resolution composite photographic image received on a personal electronic device (350, 355, 360, 365) or remote terminal (375) and elect to purchase a hard or digital copy of the selection. The selected portion may comprise a still image or a video. In some embodiments, sound recorded at the live event may be included with the selection. Coordinates relating to the center location, zoom, and time of the selected portion with respect to the composite photographic image may be relayed from the personal electronic devices (350, 355, 360, 365) or remote terminal (375) to the central processing element (305). In many embodiments, each personal electronic device (350, 355, 360, 365) or remote terminal (375) is used by a different spectator and will relay unique coordinates back to the central processing element (305).

The central processing element (305) is also in communication with a photo service (310). However, the central processing element (305) may not necessarily be in communication with all of the cameras (325, 330, 335, 340, 345), the personal electronic devices (350, 355, 360, 365) or remote terminal (375), and the photo service (310) concurrently. The central processing element (305) receives the center location, zoom, and time coordinates of spectator selections and creates a high-resolution version of the selection using the original images captured by the cameras (325, 330, 335, 340, 345). In many embodiments, the high-resolution version of the selection may undergo digital enhancement or processing prior to being sold to the requesting spectator. The high-resolution version is then relayed to the photo service (310) by the central processing element.

Additional data identifying the specific spectator requesting the selection of the high-resolution version image is stored and/or transmitted to the photo service (310). The requesting spectator may be identified based on the specific personal electronic device from which the image selection or request was made or by some other means.

In some embodiments, the photo service (310) may be an online photo service to which the high-resolution versions of the spectator selections may be uploaded. Spectators and others may then browse their selections online and request or purchase digital copies, prints, or physical media containing the selected images. This online photo service may be accessed via the Internet using a desktop or laptop computer or a personal electronic device.

In other embodiments, the photo service (310) may include one or more photo printers located at the venue of the live event. In this way, image selections made by spectators may be purchased by the spectators during or after the live event. In still other embodiments, the spectator selections may be automatically printed or put on physical media at a photo service (310) separate from the live event and sent by mail or delivery service to the spectators after payment information has been received from the spectators.

A system (300) as described herein may be an effective way to provide royalties to copyright owners of live events. In some embodiments, spectators may be permitted to obtain photographic representations of a copyrighted live event only using a system (300) according to the principles of the present specification. In this way, the copyright owner may be justly compensated for photographic reproductions of the live event. Additionally, in some embodiments, a copyright owner may screen image selections of which spectators desire to obtain physical or electronic copies and deny permission to spectators to obtain copies of image selections deemed unsuitable.

Figure 4:
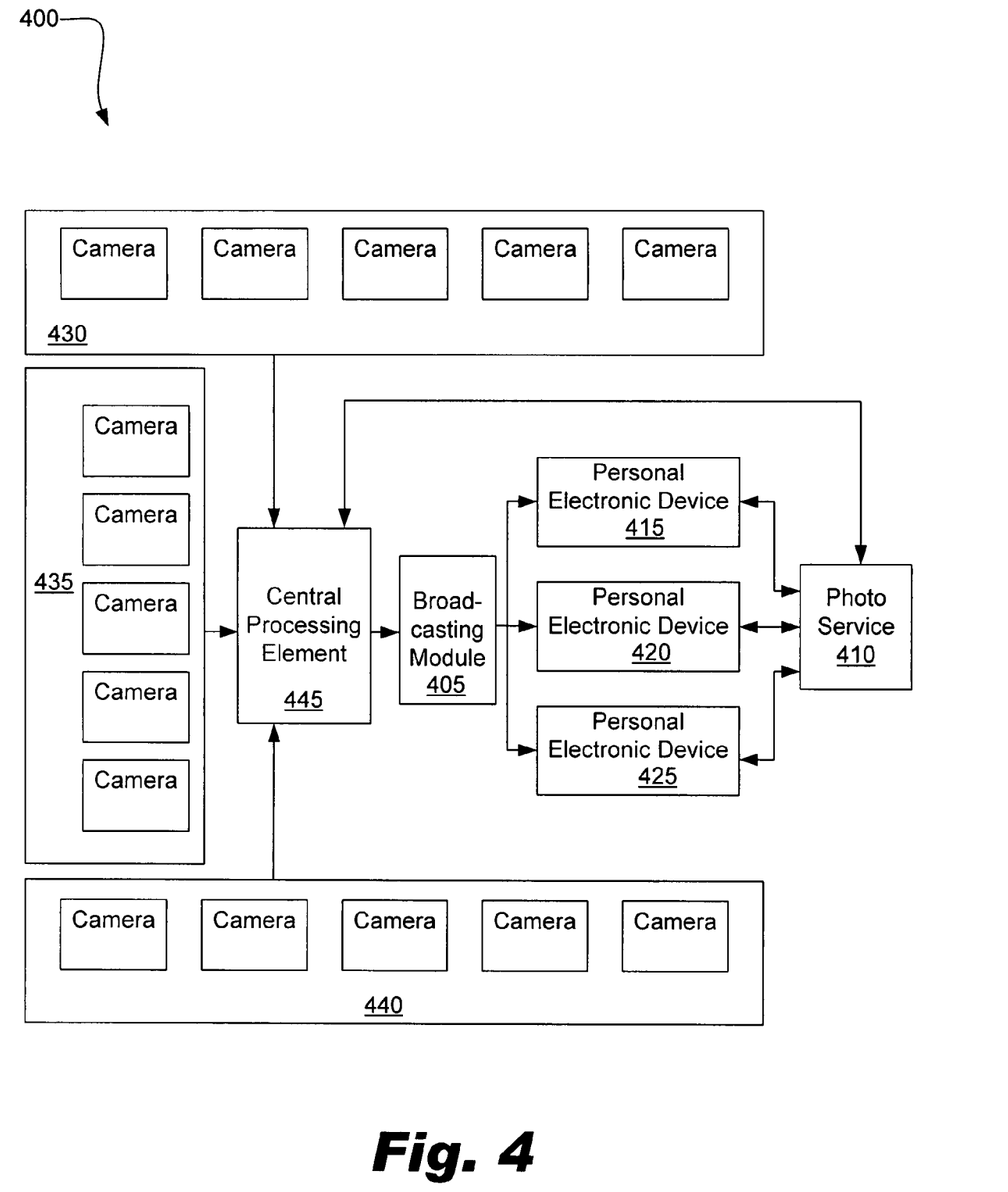
FIG. 4 is an illustration of an exemplary system for providing ideal photos of live events to spectators, according to principles described herein.

Referring now to FIG. 4, a block diagram of another exemplary system (400) for providing photographic images of live events to spectators is shown. In the exemplary system (400) of FIG. 4, a plurality of camera arrays (430, 435, 440) may be arranged at different vantage points at a live event. Each of the camera arrays (430, 435, 440) comprises a plurality of high-definition cameras providing continuously updated images at different angles from its corresponding vantage point. In this particular embodiment, the three camera arrays (430, 435, 440) provide three different composite photographic images, each composite photographic image correlating to one of the vantage points at which a camera array (430, 435, 440) has been placed.

The camera arrays (430, 435, 440) are in communication with a central processing element (445), which is in turn in communication with a broadcasting module (405) configured to broadcast a low-resolution version of the composite images to a plurality of personal electronic devices (415, 420, 425). The broadcasting module (405) may not necessarily establish an individual connection with each of the personal electronic devices (415, 420, 425). Rather, the personal electronic devices (415, 420, 425) may be configured to receive a universal broadcast of the low-resolution composite photographic images, thereby eliminating limitations on the number of supported devices that may be imposed using a traditional network model.

The broadcasting module (405) may broadcast over different frequencies the composite photographic images taken from the different camera arrays (430, 435, 440) at the different vantage points. In this manner, spectators may toggle between composite views from the different vantage points by allowing their personal electronic devices (415, 420, 425) to change the frequencies at which they receive the photographic data.

The broadcasting module (405) may broadcast the composite images implementing any of many available standard protocols, such as 802.11(x). In other embodiments, a custom protocol may be used by the broadcasting module (405) and personal electronic devices (415, 420, 425). Additionally, data encryption may be used in communications between elements of the exemplary system (400).

Each of the personal electronic devices (415, 420, 425) of the exemplary system (400) is also in communication with a photo service (410). The photo service (410) receives information about portions of the composite images selected by spectators from the personal electronic devices (415, 420, 425) and makes high-resolution versions of the spectator selections available to the spectators, typically after payments or commitments to pay have been received from the spectators. In some embodiments, the photo service (410) may be implemented in the central processing element (445). In other embodiments, the photo service (410) may be a separate device with which the personal electronic devices (415, 420, 425) communicate during or after the event.

As previously described in relation to the exemplary system of FIG. 3, the photo service (410), in some embodiments, the photo service (410 may be an online photo service to which the high-resolution versions of the spectator selections are uploaded. Spectators and others may then browse their selections online and request or purchase digital copies, prints, or physical media containing the selected images.

In other embodiments, the photo service (310) may include one or more photo printers located at the venue of the live event. In this way, image selections made by spectators may be purchased by the spectators during or after the live event. In still other embodiments, the spectator selections may be automatically printed or put on physical media at a photo service (310) separate from the live event and sent by mail or other delivery service to the spectators after payment information has been received from the spectators.

In some embodiments, the broadcasting module (405) and the photo service (410) are implemented in physically separate devices. In other embodiments, the broadcasting module (405) and the photo service (410) are governed by one central processing element, such as a server or other computer.

Exemplary Personal Electronic Devices

Figure 5:
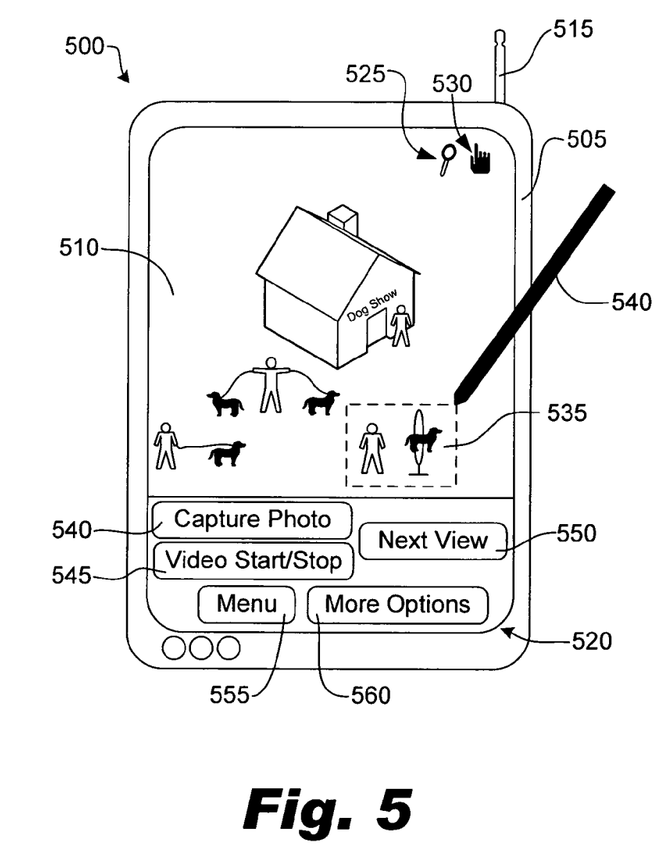
FIG. 5 is an illustration of an exemplary composite image of a live event on an exemplary personal electronic device according to principles described herein.

Referring now to FIG. 5, another exemplary personal electronic device (500) is shown. The personal electronic device (500) comprises a main case (505), a screen (520) and an antenna (515). The screen of this embodiment may be a touch-sensitive screen that is designed to both display information and images and receive user input from a stylus (540) or a user's finger or the like. The personal electronic device (500) may be a PDA or cellular phone owned by the spectator running special software provided to the spectator. In other embodiments, the personal electronic device (500) may be a device specifically designed for use with the systems of the present specification that is rented or purchased by the spectator. In yet other embodiments, personal electronic devices (500) may be remote spectator-owned computing devices (e.g., laptop and desktop computers, set-top boxes, etc.) able to communicate with the central processing system through a network such as the Internet. It is conceivable that in some embodiments, a mixture of both spectator-owned PDAs or cellular phones and rented or purchased application-specific devices may be used with systems of the present specification.

In this example, the personal electronic device is displaying an exemplary portion (510) of a composite photographic image (510) received from an array of cameras at a certain vantage point at a live event. Icons (525, 530) such as a zoom icon (525) and a pan icon (530) on the screen may be selected with the stylus (540) to activate different tools that allow the spectator to alter the selected portion (510) of the composite photographic image. For example, using a zoom tool, the spectator may select a portion (535) of the composite photographic image that is a subset of what is being displayed on the screen (520) for a more detailed view of a specific aspect of the live event.

Various buttons (540, 545, 550, 555, 560) may be displayed on the screen (520) by the software to allow the spectator to select options with the stylus (540) relating to the images displayed on the screen. For example, one button (540) may allow the spectator to capture a still photo from the images displayed on the screen (520). Another button (545) may provide the option of recording start times and stop times for a video recording desired by the spectator. Still other buttons (550, 555, 560) may allow the spectator to switch to a composite image from a different array of cameras at another vantage point, view a main menu, or view more options, respectively.

Figure 6:
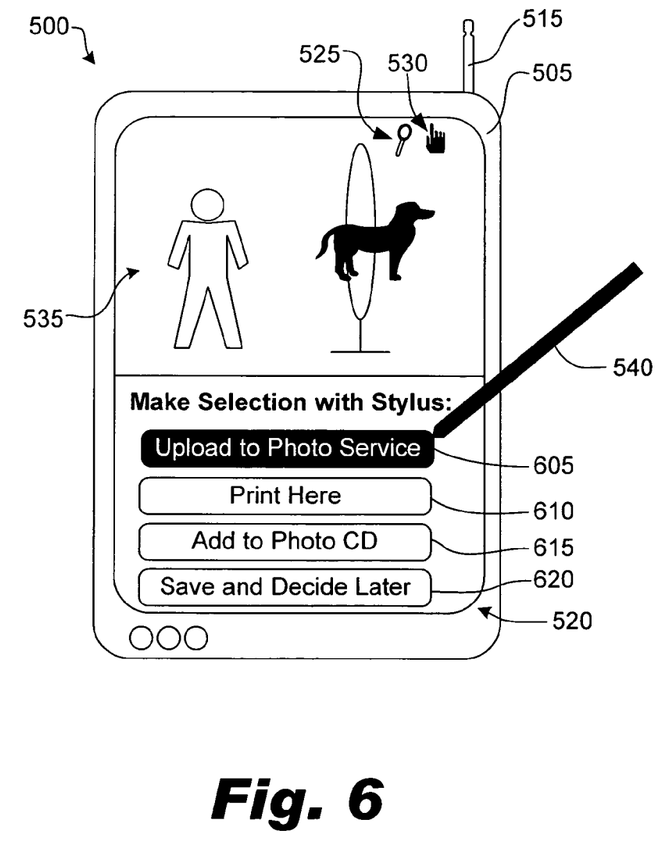
FIG. 6 is an illustration of an exemplary spectator selected image on an exemplary personal electronic device according to principles described herein.

Referring now to FIG. 6, the personal electronic device (500) is shown according to an exemplary scenario, in which a selected portion (535) of the received composite photographic image has been captured by the spectator as a still photograph. The spectator may then select different buttons (605, 610, 615, 620) displayed on the screen relating to uploading the selection to a photo service, printing the selection at the venue, adding the selection to a file of selections for a photo compact disc (CD), and saving the selection and deciding later, respectively. When a button (605) is selected by the spectator, a visual indication of the selection such as a change in button display may occur.

Figure 7:
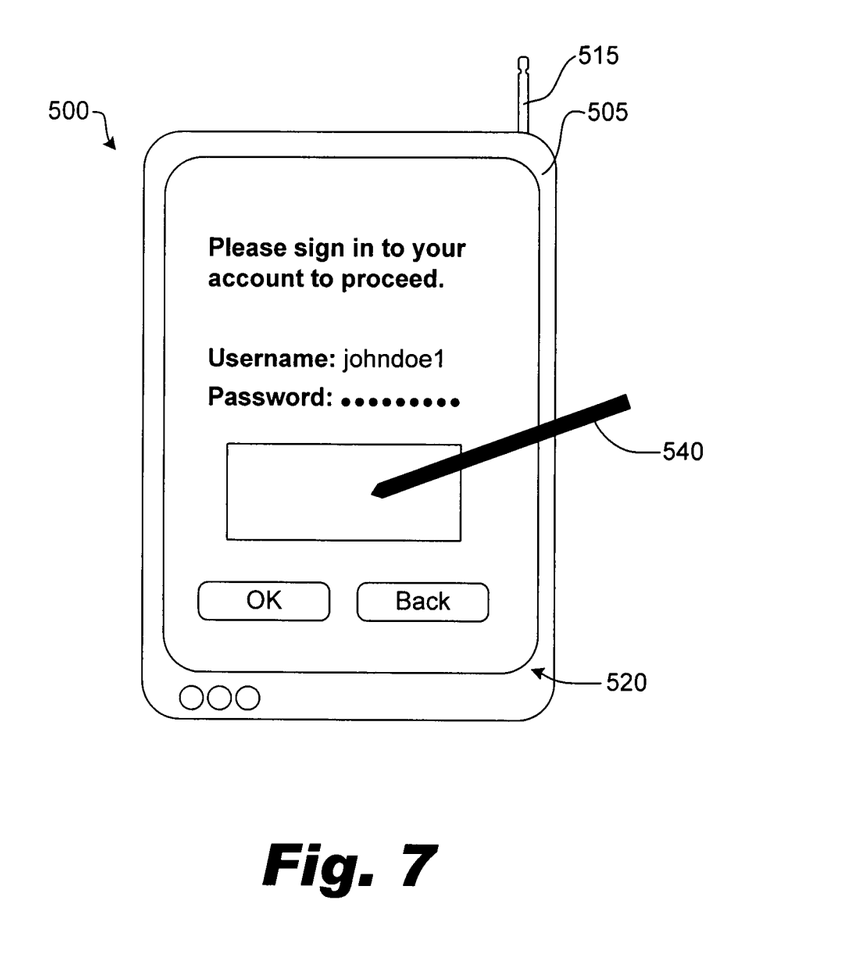
FIG. 7 is an illustration of an exemplary prompt to a spectator on a personal electronic device according to principles described herein.

Referring now to FIG. 7, the personal electronic device (500) is shown according to an exemplary scenario, in which a spectator has selected the option of uploading an image of his or her selection to an online photo service. The screen (520) is shown prompting the user to enter a username and password to the online photo service with the stylus (540). The username and password may have been previously established for the spectator online. In other embodiments, the spectator may have the option to sign up for a username and password with the online photo service using the personal electronic device (500). Once the spectator has authenticated his or her identity with the online photo service, photo printing or download options may be made available to the spectator by the online photo service on the personal electronic device (500).

Exemplary Methods

Figure 8:
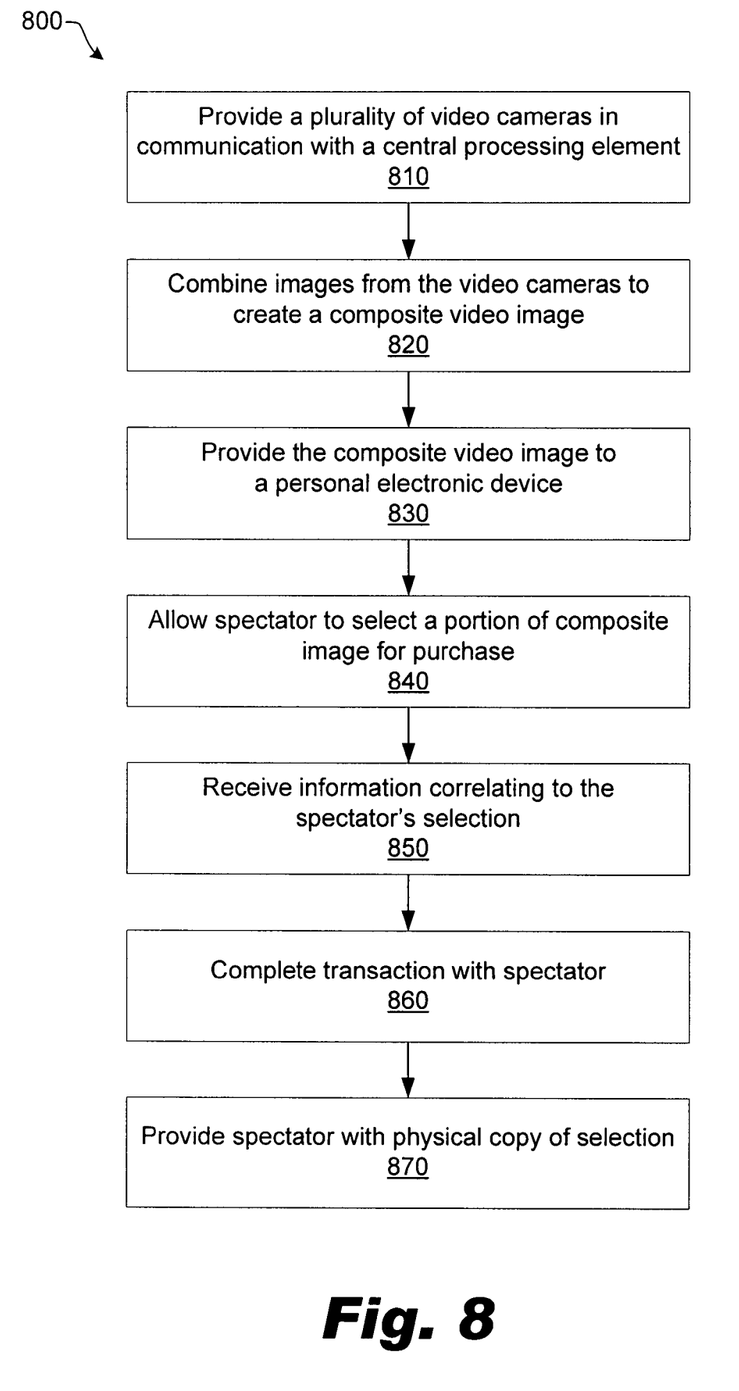
FIG. 8 is a flowchart depicting an exemplary method of providing photos of a live event to spectators, according to principles described herein.

Referring now to FIG. 8, a flowchart illustrating an exemplary method (800) of providing photographic images of live events to spectators is shown. In the method (800), a plurality of video cameras is provided (step 810). The video cameras are in communication with a central processing element. In some embodiments, the video cameras may be high definition video cameras. Examples of central processing element consistent with this method include, but are not limited to, computers, servers, application-specific integrated circuits (ASICs), other processing devices, and combinations thereof.

Images received from the video cameras in the central processing element may then be combined (step 820) to create a composite video image. The composite video image may be, for example, a tiled view of the feed from each of the cameras or may be, for example, a panoramic view of a live event from a certain vantage point at which the plurality of video cameras is situated.

The composite video image is then provided (step 830) to a personal electronic device. The composite video image may be provided (step 830) to the personal electronic device at a much lower resolution than that of the original images captured by the cameras. Furthermore, the composite video image may be provided (step 830) to the personal electronic device wirelessly.

A spectator is then allowed (step 840) to select a portion of the composite image for purchase. Examples of portion of the composite image available for purchase include, but are not limited to, photographic still shots, collections of photographic still shots, video images, collections of video images, and combinations thereof.

Information correlating to the spectator's selection is then received (step 850). The information may be received in the central processing element, or in a separate apparatus. Once a transaction is completed (step 860) with the spectator, an electronic or physical copy of the selected portion of the composite image is provided (step 870) to the spectator. Completing (step 860) the transaction may include the spectator providing, arranging, or assuring payment for the image(s). Examples of possible physical examples of the selection include, but are in no way limited to, compact discs (CDs), flash memory, physical prints, posters, albums, digital video discs (DVDs), other physical media, and combinations thereof.

Figure 9:
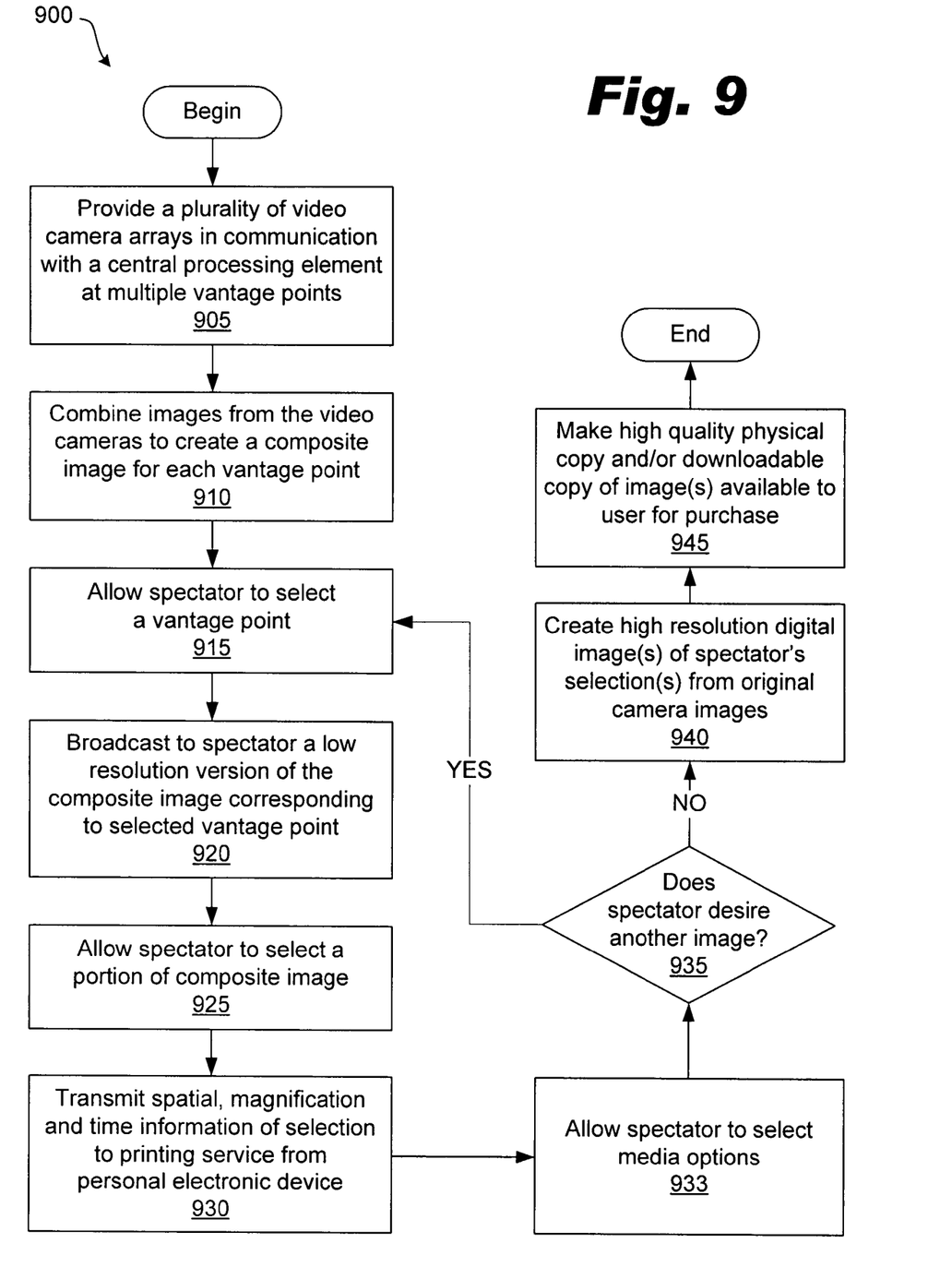
FIG. 9 is a flowchart depicting an exemplary method of providing photos of a live event to spectators, according to principles described herein.

Referring now to FIG. 9, a flowchart illustrating another exemplary method (700) of providing photographic images of live events to spectators is shown. According to the method, a plurality of video camera arrays are provided (step 905) at multiple vantage points of a live event. Each of the arrays is in communication with a central processing element, as described in relation to previous figures.

The images from the video cameras of each array are combined (step 910) in the central processing element to create a composite image for each of the vantage points. A spectator at the live event is allowed (step 915) to select a vantage point using a personal electronic device. A low-resolution version of the composite image corresponding to the selected vantage point is then broadcast to the spectator (step 920) through the personal electronic device.

Once the low-resolution version of the composite image has been received by the spectator, the spectator is allowed (step 925) to select a portion of the composite image of which he or she may desire to obtain a physical or electronic copy. Spatial, magnification, and time information relating to the selection are transmitted (step 930) to a printing service from the personal electronic device. The spectator may then be allowed (step 933) to select media options from which the selection may be ordered. The media options may include, among other options, the type of media on which the spectator desires to receive the selection.

It is then determined (step 935) if the spectator desires another image. If so, the spectator is allowed to select a vantage point (step 915) and the steps of broadcasting (step 920), allowing the spectator to select a portion of the composite image (step 925), and transmitting information (step 930) are repeated.

When the spectator does not desire another image, high resolution images of the spectator's selections are then created (step 940) from the original camera images. High quality physical copies and/or downloadable electronic copies of the created photographic images are then made available (step 945) to the spectator for purchase.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of providing photographic images of live events to a spectator, said method comprising:
    obtaining at least one photographic image from at least one camera at said live event;
    providing a version of said at least one photographic image to an electronic device being used by said spectator;
    receiving a selection of a said photographic image or a portion of a said photographic image selected by said spectator using said electronic device;
    responsive to receiving said selection, providing a copy of said selection to said spectator, said copy comprising a higher resolution than said version of said at least one photographic image provided to said electronic device used by said spectator; and
    storing said selection along with an identification of said spectator making said selection in an online photo service.

2. The method of 1, wherein said step of obtaining at least one photographic image from said at least one camera comprises producing a composite photographic image using images from a plurality of cameras.

3. The method of 1, wherein said electronic device is owned by said spectator.

4. The method of 3, further comprising providing software to said spectator for said electronic device to permit said electronic device to receive said version of said at least one photographic image.

5. The method of 1, further comprising renting said electronic device to said spectator.

6. The method of 1, wherein said version of said at least one photographic image provided to said electronic device comprises a lower resolution image than obtained from said at least one camera.

7. The method of 1, wherein said selection comprises a number of still images, a segment of a video image, a portion of a still image or combinations thereof.

8. The method of 1, further comprising receiving payment from said spectator who is purchasing said copy of said selection from said online photo service.

9. The method of 8, further comprising delivering said copy purchased by said spectator as a printed image, or an image stored on physical recording media or an electronic copy, as requested by said spectator.

* * * * *

UNITED STATES PATENT AND TRADEMARK OFFICE
CERTIFICATE OF CORRECTION

PATENT NO. : 8,599,253 B2  
APPLICATION NO. : 11/732427  
DATED : December 3, 2013  
INVENTOR(S) : Bradley R. Larson et al.

It is certified that error appears in the above-identified patent and that said Letters Patent is hereby corrected as shown below:

In the Claims

In column 10, line 58, in Claim 2, delete "of" and insert -- of claim --, therefor.

In column 10, line 62, in Claim 3, delete "of" and insert -- of claim --, therefor.

In column 10, line 64, in Claim 4, delete "of" and insert -- of claim --, therefor.

In column 11, line 1, in Claim 5, delete "of" and insert -- of claim --, therefor.

In column 11, line 3, in Claim 6, delete "of" and insert -- of claim --, therefor.

In column 11, line 7, in Claim 7, delete "of" and insert -- of claim --, therefor.

In column 11, line 10, in Claim 8, delete "of" and insert -- of claim --, therefor.

In column 11, line 13, in Claim 9, delete "of" and insert -- of claim --, therefor.

Signed and Sealed this  
Twelfth Day of August, 2014

Michelle K. Lee  
*Deputy Director of the United States Patent and Trademark Office*